United States Patent
Dinerstein et al.

(10) Patent No.: US 9,305,208 B2
(45) Date of Patent: Apr. 5, 2016

(54) SYSTEM AND METHOD FOR RECOGNIZING OFFENSIVE IMAGES

(71) Applicant: Blue Coat Systems, Inc., Sunnyvale, CA (US)

(72) Inventors: Jonathan Jeremiah Dinerstein, Draper, UT (US); Joshua David Dinerstein, Draper, UT (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 97 days.

(21) Appl. No.: 13/740,136

(22) Filed: Jan. 11, 2013

(65) Prior Publication Data

US 2014/0198982 A1 Jul. 17, 2014

(51) Int. Cl.
*G06K 9/00* (2006.01)

(52) U.S. Cl.
CPC ........ *G06K 9/00362* (2013.01); *G06K 9/00234* (2013.01)

(58) Field of Classification Search
CPC .......... G06K 9/00228; G06K 9/00362; G06K 9/00281; G06K 9/0061; G06K 9/6293; G06K 9/46; G06K 9/00221; G06K 9/00234; G06K 9/6227; G06K 9/4652; G06K 9/6267; G06T 7/408; G06T 7/004; G06T 7/2013
See application file for complete search history.

(56) References Cited

U.S. PATENT DOCUMENTS

| | | | |
|---|---|---|---|
| 7,027,645 B2* | 4/2006 | Swift | 382/165 |
| 8,406,482 B1* | 3/2013 | Chien et al. | 382/118 |
| 2002/0156917 A1* | 10/2002 | Nye | 709/238 |
| 2003/0002709 A1* | 1/2003 | Wu | 382/100 |
| 2004/0208361 A1* | 10/2004 | Buzuloiu et al. | 382/165 |
| 2006/0083428 A1* | 4/2006 | Ghosh et al. | 382/224 |
| 2007/0116328 A1* | 5/2007 | Sablak et al. | 382/103 |
| 2009/0123064 A1* | 5/2009 | Gibbs | 382/165 |
| 2010/0272363 A1* | 10/2010 | Steinberg et al. | 382/190 |
| 2010/0306793 A1* | 12/2010 | Vilei | 725/25 |
| 2010/0310158 A1* | 12/2010 | Fu et al. | 382/159 |
| 2012/0224769 A1* | 9/2012 | White et al. | 382/165 |

FOREIGN PATENT DOCUMENTS

CN 1691054 A * 11/2005

* cited by examiner

*Primary Examiner* — Jingge Wu
(74) *Attorney, Agent, or Firm* — Parker Ibrahim & Berg LLC; James M. Behmke; Kenneth J. Heywood (57) ABSTRACT

According to one aspect, a method for categorizing at least one image includes obtaining the at least one image and mapping the at least one image to at least a first grid. The first grid is a two-dimensional grid that includes a plurality of cells. The method also includes characterizing the first grid, wherein categorizing the first grid includes determining whether the first grid is indicative of an offensive characteristic, and identifying the at least one image as offensive when it is determined that the first grid is indicative of the offensive characteristic. When it is determined that the first grid is not indicative of the offensive characteristic, the at least one image is identified as not offensive.

22 Claims, 9 Drawing Sheets

SYSTEM AND METHOD FOR RECOGNIZING OFFENSIVE IMAGES

BACKGROUND

1. Field of Invention

The present disclosure relates generally to categorizing images. More particularly, the present disclosure relates to precisely and efficiently detecting pornographic images located on the Internet or within email communications.

2. Description of the Related Art

Offensive images, e.g., pornographic images, are often available on the Internet, and are often sent in email communications to unwitting parties. Pornography is prevalent on the Internet, both in legal and illegal forms. Some parties may find it offensive to view pornographic images. For other parties, viewing pornographic images may result in legal liability issues.

Images may be categorized using a text-based analysis and categorization. While text-based analysis and categorization may be effective in categorizing pornographic images, a text-based analysis and categorization is generally only effective when a significant amount of text is included in a web page or an email associated with an image. When little or no text is present in a web page or an email, a text-based analysis and categorization is ineffective. Similarly, if text is presented in an image rather than in raw form, e.g., on a web page or an email associated with the image, text-based analysis and categorization is also ineffective.

Some techniques, as for example computer vision techniques, used to identify pornographic images require a significant amount of processing time and, therefore, may not be efficiently used to process relatively high volumes of data. In addition, the precision associated with many techniques is insufficient to accurately categorize small images, e.g., thumbnail images, and may be inaccurate. For example, images of individuals wearing swimsuits may be inaccurately identified as pornographic images. Requiring significant processing time, requiring high image resolution, and providing insufficient precision results limits the ability to efficiently and effectively identify pornographic images.

SUMMARY

The present invention pertains to a system and a method for reliably and efficiently recognizing offensive images, e.g., pornographic images, found on a network, e.g., the Internet. By detecting pixels in an image which are associated with the color of skin, and substantially mapping the pixels into a two-dimensional Boolean grid, the image may be categorized by comparing the two-dimensional Boolean grid to information associated with typical offensive images.

According to one aspect, a method for categorizing at least one image includes obtaining the at least one image and mapping the at least one image to at least a first grid. The first grid is a two-dimensional grid that includes a plurality of cells. The method also includes characterizing the first grid, wherein categorizing the first grid includes determining whether the first grid is indicative of an offensive characteristic, and identifying the at least one image as offensive when it is determined that the first grid is indicative of the offensive characteristic. When it is determined that the first grid is not indicative of the offensive characteristic, the at least one image is identified as not offensive.

In one embodiment, the at least one image is a thumbnail image. In another embodiment, the method includes processing the at least one image. Processing the at least one image includes transforming the at least one image into a hue saturation brightness (HSB) color space, classifying hue components and saturation components associated with the at least one image, and ignoring brightness components associated with the at least one image. In still another embodiment, the method includes obtaining a first image and a second image that have an association, and categorizing the association as offensive if the first image and the second image are both indicative of the offensive characteristic.

According to another aspect, an apparatus for categorizing at least one image includes a communications interface, an image detection module that includes logic, and a processing arrangement configured to execute the logic. The communications interface is arranged to obtain at least a first image. The image detection module is configured to obtain information relating to pixels included in the first image and to map the information into a grid, and is also configured to classify the grid as either consistent with the first image being offensive or consistent with the first image being non-offensive.

In one embodiment, the image detection module divides the pixels included in the first image into a plurality of pixel blocks and identifies a set of pixel blocks included in the plurality of pixel blocks which predominantly contain pixels of a particular range of colors. In such an embodiment, the image detection module maps the information into the grid by identifying the set of pixel blocks which predominantly contain pixels of the particular range of colors in the grid.

BRIEF DESCRIPTION OF THE DRAWINGS

The embodiments will be readily understood by the following detailed description in conjunction with the accompanying drawings, in which.

DETAILED DESCRIPTION OF THE EMBODIMENTS

Example embodiments of the present invention are discussed below with reference to the various figures. However, those skilled in the art will readily appreciate that the detailed description given herein with respect to these figures is for explanatory purposes, as the invention extends beyond these embodiments.

Pornographic images are prevalent on the Internet, in both legal and illegal forms. Many individuals consider pornographic or other offensive images to be offensive, and would prefer to reduce the likelihood that they may accidentally access the images. For other parties, such as those who are part of a corporation, access to pornographic or other offensive images may result in legal liability issues for the corporation. As such, the ability to identify pornographic images or, more generally, offensive images is desirable.

Offensive images, as mentioned above, generally include pornographic images. In addition, offensive images may also include, but are not limited to including, obscene images, indecent images, immoral images, nude images, and/or explicit images, e.g., sexually explicit images. Typically, offensive images include images in which a significant amount of skin is visible.

By allowing offensive images to be reliably, relatively quickly, and efficiently detected, parties may be made aware of the existence of the offensive images before displaying the offensive images, e.g., on a display screen of a mobile phone or computing device. For example, when nudity is detected in a thumbnail image displayed on a web page, reliably and relatively quickly detecting the existence of the nudity may enable a user to be warned that the thumbnail image includes nudity prior to the user expanding the thumbnail image into a larger image.

In one embodiment, offensive images may be detected in images of substantially any resolution and substantially any compression quality. Offensive images may be precisely and efficiently detected. To identify an offensive image, pixels in an image which are of a color consistent with the color of human skin may be detected, and information associated with the image may be mapped to a grid with cells associated with different blocks of the pixels. Contents of the cells indicate whether a corresponding block of pixels in the image appear to contain skin color pixels. That is, cells in the grid are arranged to effectively identify blocks of pixels which contain pixels that are skin colored. The grid may be classified to determine if the contents of the cells, particularly contents of the cells which identify blocks of pixels that contain skin color pixels, are consistent with known offensive images. By way of example, the location of cells in a grid which identify pixel blocks that include skin color pixels may be compared to locations of skin color in known offensive or pornographic poses. As will be appreciated by those skilled in the art, a pornographic pose may generally be a nude pose or an otherwise suggestive pose. When a grid associated with an image is indicative of an offensive or pornographic pose, the image may be identified as offensive or pornographic.

Skin color or, more specifically, human skin color may vary widely from light, e.g., almost white, to dark, e.g., almost black. As will be appreciated by those skilled in the art, the pigmentation of skin may vary and, in some instances, pigmentation of skin on an individual may be uneven. Skin color or tones may be classified as either "skin" or "not skin." Any suitable technique may generally be used to effectively detect skin in digital images. Skin tones or colors may be effectively defined using von Luschan's chromatic scale. Using von Luschan's chromatic scale, skin colors may range from a value of one, which indicates a very light or almost white color to a value of thirty-six, which indicates a very dark or almost black color. It should be appreciated that in classifying pixels as either skin or not skin, the color associated with pixels classified as skin may be defined using any suitable scale.

Dividing an image into blocks of pixels, identifying blocks of pixels which contain skin color pixels, and mapping the blocks of pixels to cells of a grid, e.g., a two-dimensional Boolean grid, allows the image to be precisely and efficiently processed to determine if the image is offensive. An image of substantially any size may be precisely and efficiently processed, e.g., a thumbnail size image may be precisely and efficiently processed. A thumbnail size image is generally a reduced size version of a larger image. Typically, thumbnail sized images are of a lower resolution than the larger size counterparts. "Thumbnails" are often included on web pages as they may load faster than their original, generally larger sized, corresponding images. Downloading thumbnails rather than larger images on a web page may reduce download time associated with downloading the web page, and utilize less bandwidth than would be used if larger images are downloaded.

Figure 1:
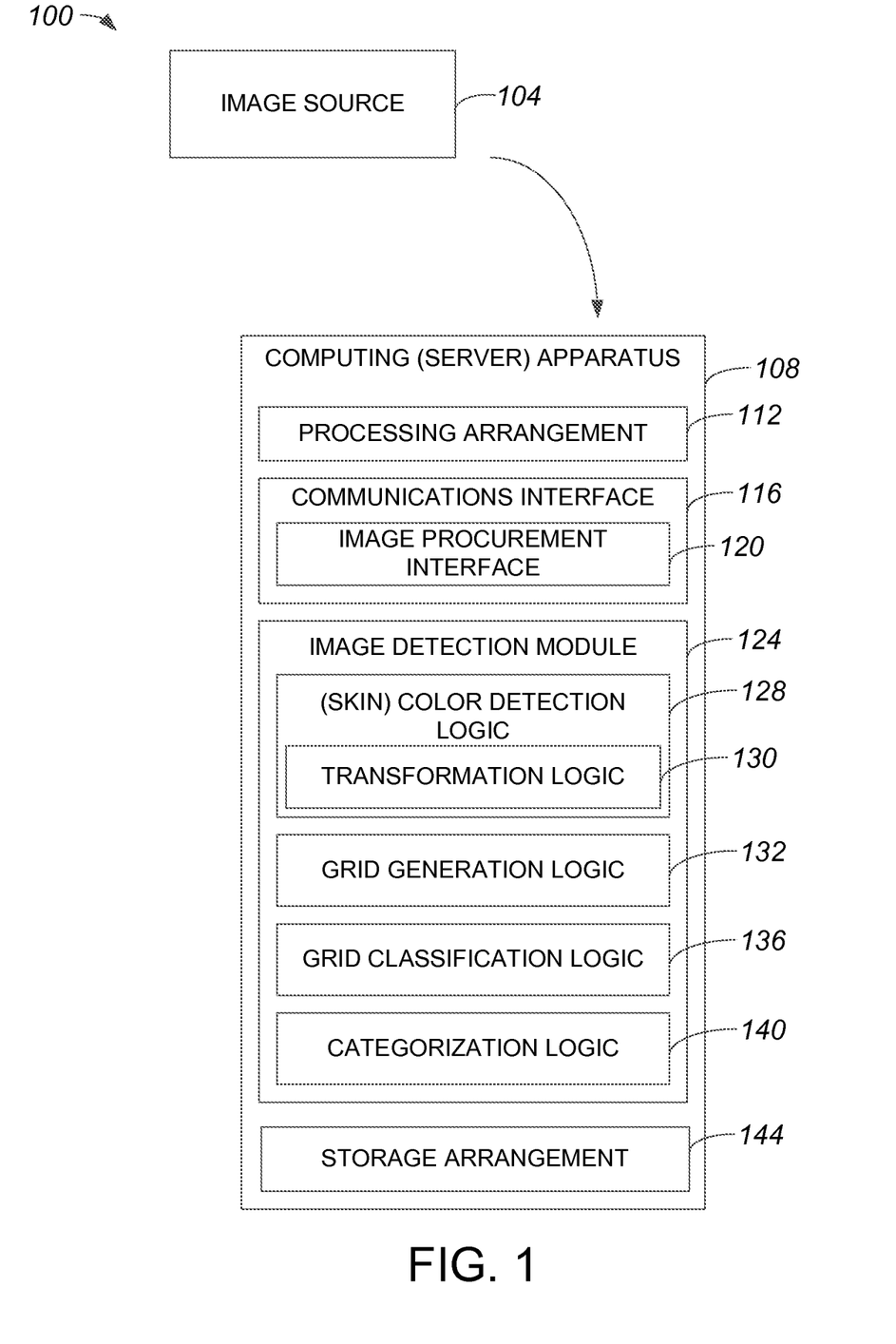
FIG. 1 is a block diagram representation of an overall system that is suitable for identifying offensive images, e.g., pornographic images, in accordance with an embodiment.

Referring initially to FIG. 1, an overall system that is suitable for precisely and efficiently recognizing an offensive image as being offensive, e.g., pornographic, will be described in accordance with an embodiment. An overall system 100 which may be part of a communications network includes a computing, e.g., server, apparatus 108 and an image source 104. Computing apparatus 108 is generally arranged to obtain an image from image source 104, and to determine whether the obtained image is offensive, e.g., to recognize when the obtained image contains an offensive human pose. Image source 104 may be a database in which images are stored, a camera that captures images, or any suitable device that is arranged to capture and/or to store images. In one embodiment, image source 104 may be an Internet domain, an email, or a web page.

Computing apparatus 108 generally includes a processing arrangement 112, a communications interface 116, an image detection module 124, and a storage arrangement 144. Processing arrangement 112 is generally arranged to execute logic, e.g., computer program code, such as logic included in image detection module 124. In addition, processing arrangement 112 is also arranged to process signals obtained by computing apparatus 108. In one embodiment, processing arrangement 112 includes at least one central processing unit (CPU) (not shown).

Communications interface 116 is configured to allow computing apparatus 108 to communicate within a network, as for example with image source 104. Communications interface 116 includes an image procurement interface 120 arranged to obtain an image from image source 104. Image procurement interface 120 may generally obtain images in photographs and images contained in video. Obtained images may include images of any size, e.g., thumbnail sized images. Image procurement interface 120 may include an input/output (I/O) interface (not shown) that allows a user to interact with computing apparatus 108, in one embodiment, to substantially directly upload an image to computing apparatus 108.

Image detection module 124 generally includes hardware and/or software logic that allows computing apparatus 108 to recognize when a particular image includes offensive material, e.g., a nude pose or a pornographic pose. Image detection module 124 includes color detection logic 128, grid generation logic 132, grid classification logic 136, and categorization logic 140.

Color detection logic 128 is configured to identify colors contained in an obtained image, or an image that is to be categorized or characterized. In one embodiment, color detection logic 128 may be configured to specifically identify colors which are in the range of colors of human skin. That is, color detection logic 128 may be configured such that colors in an image which are consistent with colors of human skin may be recognized, e.g., such that pixels the color of human skin may be identified. As shown, color detection logic 128 includes transformation logic 130 that is configured to transform an image to a hue saturation brightness (HSB) color space prior to identifying skin color pixels.

Grid generation logic 132 is arranged to transition information relating to skin color detected in an image from a pixel level to a grid level. A grid is generated to which include cells or entries corresponding to different blocks of pixels in an image. Grid generation logic 132 may group pixels of an image into blocks, and then store information relating to each of the blocks into a corresponding cell in the grid. In one embodiment, a grid generated by grid generation logic 132 may be a two-dimensional grid which contains a Boolean value in each cell that identifies whether a corresponding block of pixels contains skin color pixels.

Grid classification logic 136 classifies a grid generated by grid generation logic 132. Grid classification logic 136 may effectively compare the information in the grid to information related to known offensive, e.g., pornographic, human poses in order to determine whether the grid is consistent with an offensive pose. That is, grid classification logic 136 may effectively analyze a grid to assess whether the information contained in the grid is indicative of an offensive characteristic such as a human in an offensive pose.

Categorization logic 140 is arranged to categorize an image as either offensive or not offensive. When a single image is to be categorized, categorization logic 140 may use a classification of a grid associated with the image to categorize the image as offensive or not offensive. When multiple images are to be categorized, e.g., when a web page which includes a plurality of images is to be categorized based on the plurality of images, categorization logic 140 is configured to weight the classifications of grids associated with the images and to determine an overall categorization for the multiple images as a whole.

Storage arrangement 144 may generally store any information that is used by computing apparatus 108 to obtain, analyze, and categorize an image. For example, storage arrangement 144 may store grids generated by grid generation logic 132, information related to poses to which grids may be compared, results of grid classification, and/or results of categorizing images.

Figure 2:
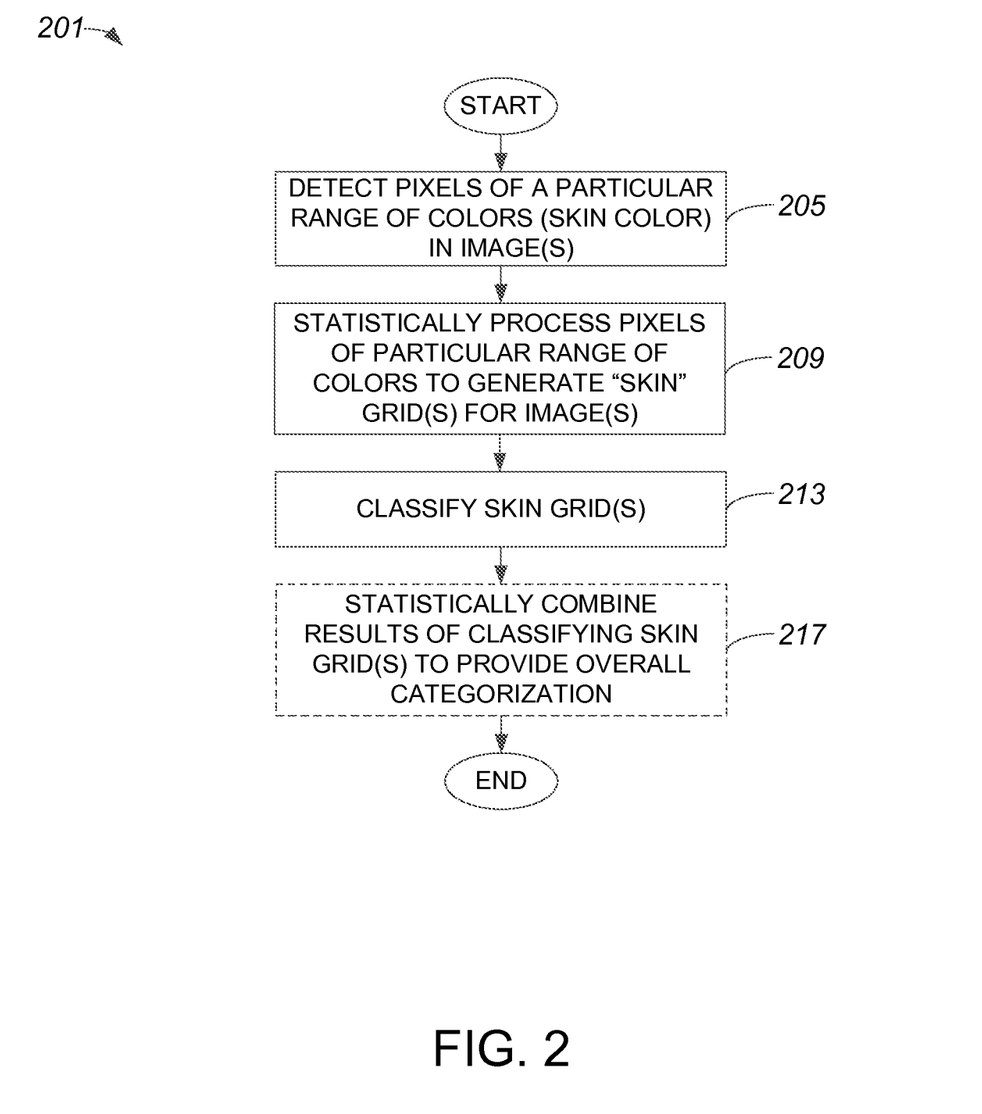
FIG. 2 is a process flow diagram which illustrates a method of categorizing at least one offensive image in accordance with an embodiment.

With reference to FIG. 2, a general method of categorizing at least one image using an image detection module, e.g., image detection module 124 of FIG. 1, will be described in accordance with an embodiment. A process 201 of categorizing one or more images begins at step 205 in which pixels of a particular range of colors are detected in one or more images. The images may be obtained from any suitable source, e.g., from the Internet or in an email. Any number of images may generally be obtained, and the images may be still images or video images contained in individual frames of a video. In one embodiment, the pixels of a particular range of colors may be pixels within a range of colors that correspond to the colors of human skin. One method of detecting pixels of a particular range of colors will be discussed below with respect to FIG. 3.

Once pixels of a particular range of colors are detected, the pixels of the particular range of colors are processed in step 209 in order to generate at least one "skin" grid. In general, each image may have its own associated skin grid. A skin grid may be, in one embodiment, a two-dimensional Boolean grid that is mapped to an image, and includes entries which indicate where in an image skin color has been detected. One method of processing pixels to generate at least one skin grid will be discussed below with reference to FIG. 4.

Figure 6A:
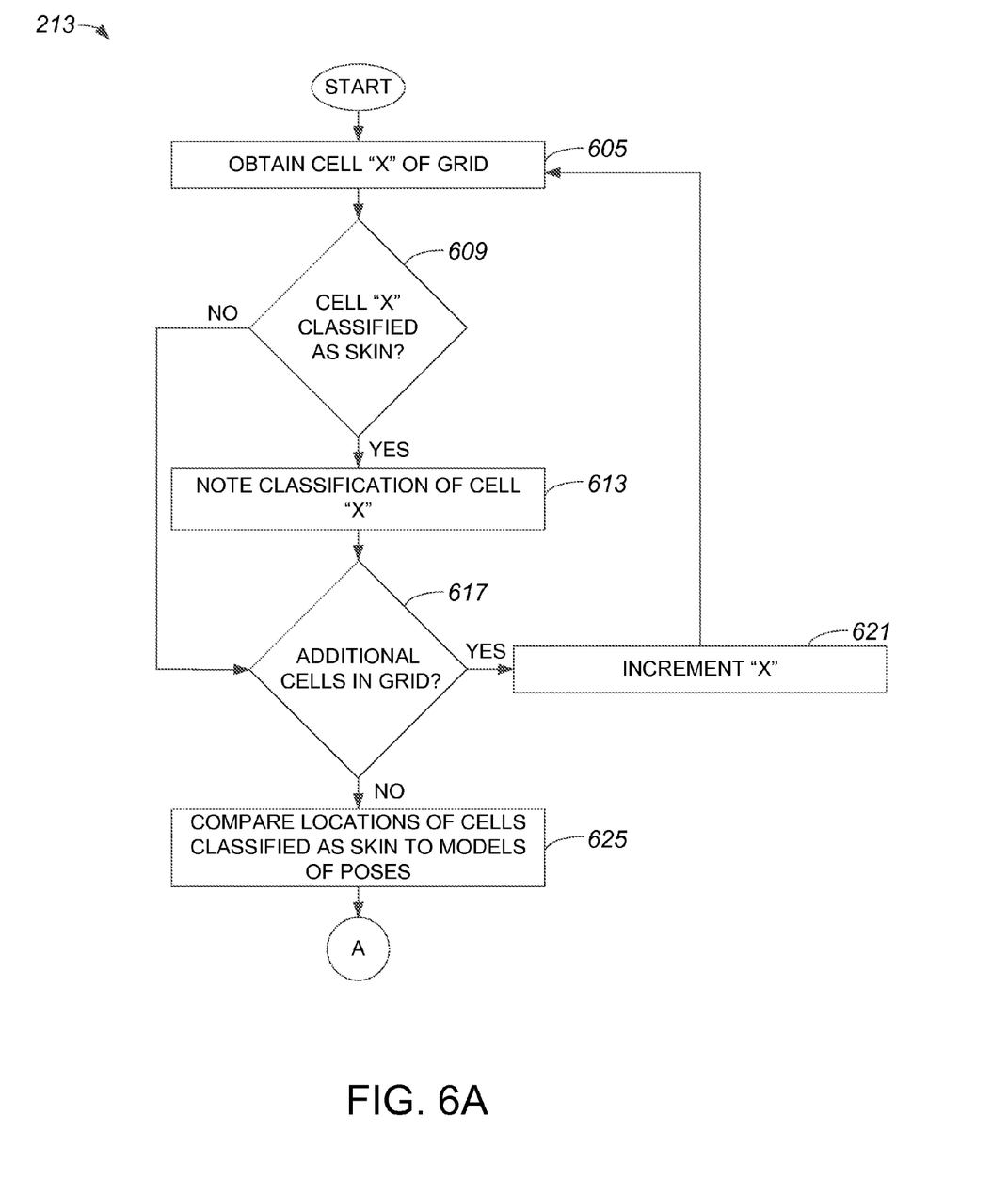
FIGS. 6A and 6B are a process flow diagram which illustrates a method of classifying at least one skin grid, e.g., step 213 of FIG. 2, in accordance with an embodiment.
Figure 6B:
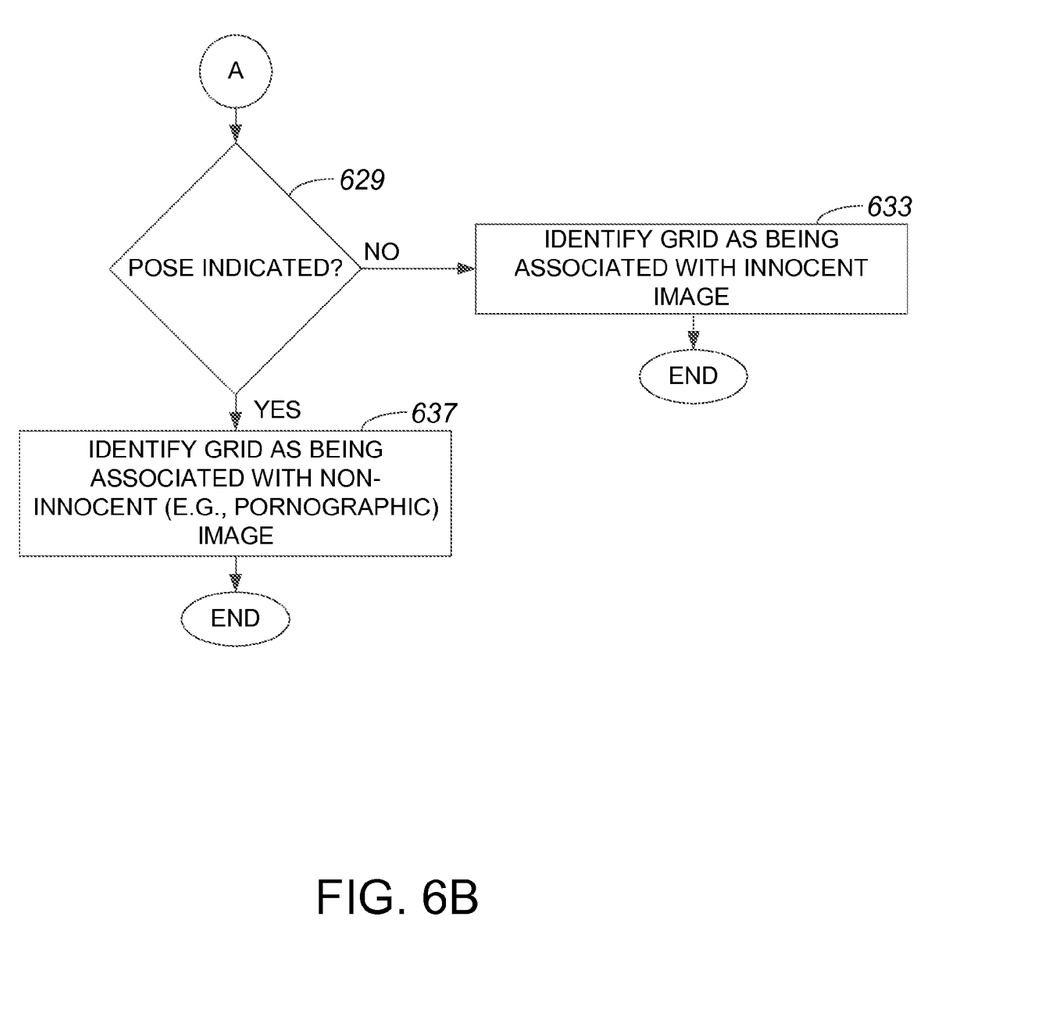

In step 213, skin grids are classified. Classifying a skin grid generally includes determining whether the skin grid is indicative of an offensive human pose, e.g., a pornographic human pose. Classifying a skin grid will be discussed below with respect to FIG. 6. After skin grids are classified, process flow moves to an optional step 217 in which results of the classification of skin grids are statistically combined to provide an overall characterization or categorization of one or more images. For example, when multiple images are associated with a single domain or email, the classification of skin grids associated with each of the multiple images may be combined to categorize the single domain or email. Alternatively, when multiple images are frames of a video, the classification of skin grids associated with each of the multiple images may be combined to categorize the video. The combination of classifications of skin grids to provide an overall categorization will be described below with reference to FIG. 7. The process of categorizing one or more images is completed after skin grids are classified and, optionally, after an overall categorization is provided.

Figure 3:
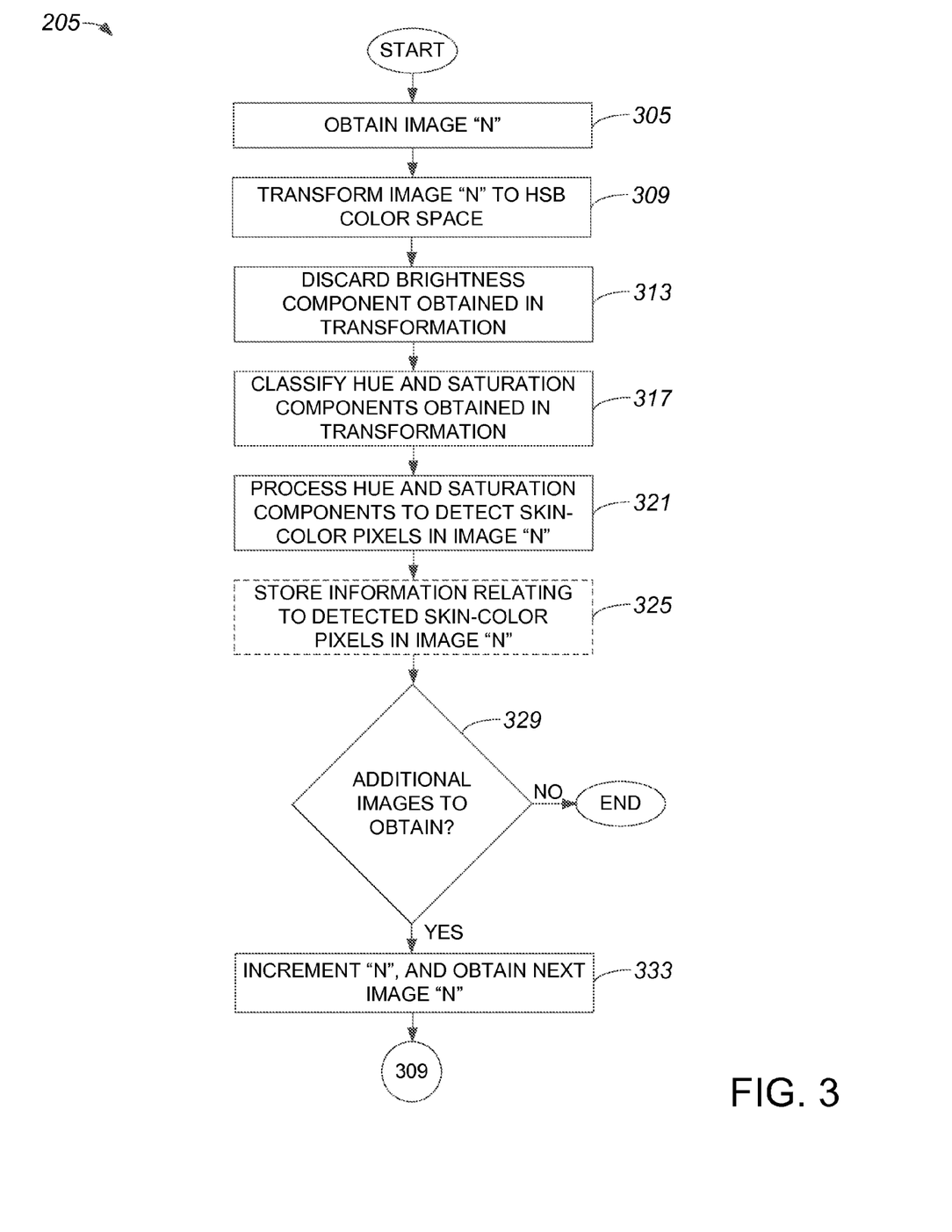
FIG. 3 is a process flow diagram which illustrates a method of detecting pixels of a particular range of colors in at least one image, e.g., step 205 of FIG. 2, in accordance with an embodiment.

As mentioned above, the categorization of an image begins with detecting pixels of a particular range of colors. FIG. 3 is a process flow diagram which illustrates a method of detecting pixels of a particular range of colors in at least one image, e.g., step 205 of FIG. 2, in accordance with an embodiment. A process 205 of detecting pixels of a particular range of colors, begins at step 305 in which an image, e.g., image "N", is obtained. Image "N" may be a still image such as a photograph, or may be a first frame in a video. For purposes of discussion, pixels of a range of colors will be generally be referred to as "skin-color" pixels, or pixels which are of colors which are typical of human skin.

Once image "N" is obtained, image "N" is transformed from its original color space to a HSB color space in step 309. When image "N" is obtained in a red green blue (RGB) color space, image "N" may be transformed from the RGB color space to an HSB color space. It should be appreciated that if image "N" is originally in a HSB color space, then no transformation may be needed.

In step 313, brightness components obtained when image "N" was transformed to the HSB color space are discarded. That is, brightness components associated with image "N" are effectively ignored. Discarding brightness components may enable the more efficient detection of human skin in an image regardless of race. As will be appreciated by those skilled in the art, brightness components encode information about lightness, whereas hue and saturation components encode information about the color of a pixel. Thus, by discarding the brightness components, variations in pixels representing human skin due to race or illumination may effectively be ignored, and pixels representing human skin may be detected more reliably.

After brightness components are discarded, hue and saturation components are classified in step 317. The components may be classified as either skin or not skin. That is, skin may essentially be detected. Classifying hue and saturation components may involve the use of any suitable types of classifiers including, but not limited to including, a support vector machine. In general, hue and saturation components may be classified using a statistical model generated from many examples of skin contained in digital images.

From step 317, process flow moves to step 321 in which the hue and saturation components are processed to identify the components that indicate the existence of skin-color pixels in image "N". Information relating to skin-color pixels in image "N" may optionally be stored in step 325.

A determination is made in step 329 as to whether there are additional images to obtain. That is, it is determined whether additional images are to be processed. There may be additional images to obtain, for example, if multiple images associated with a web page or a video are to be analyzed to subsequently obtain an overall categorization for the web page or the video. If the determination in step 329 is that there are no additional images to obtain, than the process of detecting pixels in a particular range of colors is completed. Alternatively, if it is determined that there are additional images to obtain, "N" is incremented in step 333, and the next image "N" is obtained. Once the next image "N" is obtained, process flow returns to step 309 in which image "N" is transformed to HSB color space.

Figure 4:
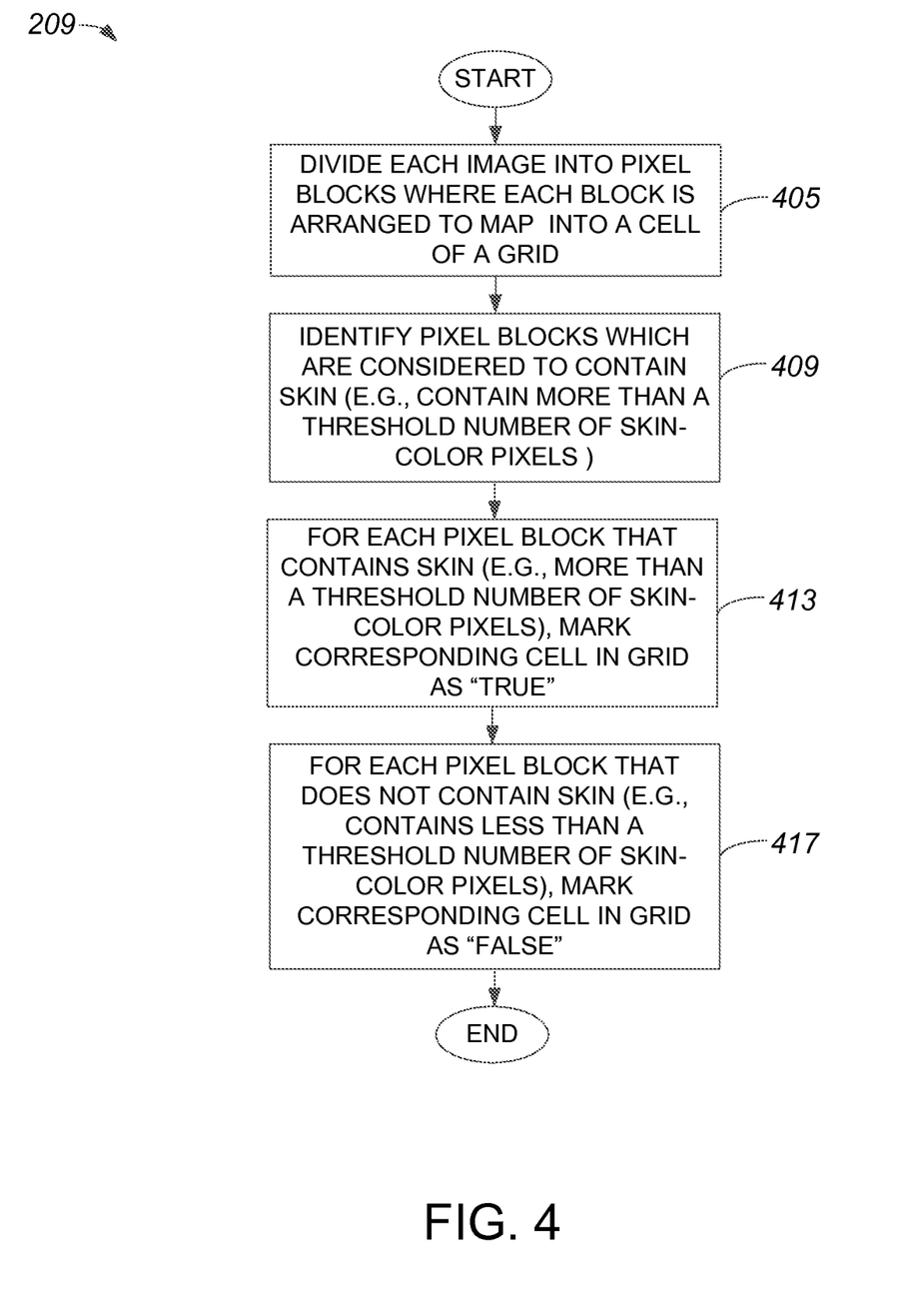
FIG. 4 is a process flow diagram which illustrates a method of processing pixels to generate at least one "skin" grid, e.g., step 209 of FIG. 2, in accordance with an embodiment.

Referring next to FIG. 4, a method of processing pixels to generate at least one skin grid, e.g., step 209 of FIG. 2, will be described in accordance with an embodiment. A method 209 of processing pixels to generate at least one skin grid begins at step 405 in which each image is effectively divided into pixel blocks each including at least one pixel. In one embodiment, the image may be divided into disjoint blocks that are each arranged to map to a cell of a grid, e.g., a cell of a skin grid. It should be appreciated that each image generally has its own associated grid.

Skin grids, which may be two-dimensional Boolean grids, associated with an analysis are generally of a fixed size. That is, the sizes or dimensions of grids associated with images which are divided into pixel blocks are substantially the same. The number of pixel blocks that each image is to be divided into is typically dependent upon the size or dimensions of the grids. For example, the number of pixel blocks associated with an image may correspond to a number of cells in a grid such that a mapping between pixels blocks of an image to cells of a grid may be a one-to-one mapping.

After each image is divided into pixel blocks, pixels blocks that are considered to contain skin, i.e., to be associated with the depiction of skin, are identified in step 409. In one embodiment, pixel blocks that contain more than a threshold number of skin-color pixels are identified. The threshold number of pixels may vary widely. For example, a threshold number may correspond to fifty percent of pixels in a pixel block containing skin-color pixels being sufficient for the pixel block to be considered as containing skin. It should be appreciated that statistical tests may also be applied to determine whether a particular pixel block is considered to contain skin. The statistical tests may include, but are not limited to including, determining ratios of skin to non-skin detections, determining probabilities of each pixel classification, and assessing the connections between adjacent or neighboring skin-color pixels.

In step 413, pixels blocks which are considered to contain skin are identified, and are mapped to a corresponding cell in an associated grid. In one embodiment, each pixel block that contains more than a threshold number of skin-color pixels is identified as containing skin. For each pixel block of an image that is identified as containing skin, a corresponding cell in a grid associated with the image is effectively marked as "true." That is, each pixel block of an image that is identified as containing more than a threshold number of skin-color pixels is mapped to a cell in an associated grid that is marked as "true." In general, if substantially all statistical tests are passed with respect to a particular pixel block, the corresponding cell is marked as "true."

Once cells in a grid are marked as "true" to denote that the cells are associated with pixel blocks identified as containing skin, each pixel block that is considered not to contain skin is mapped in step 417 to a cell in a grid associated with the image, and the cell is marked as "false." In one embodiment, cells in a grid marked as "false" are effectively identified as corresponding to a pixel block that contains less than a threshold number of skin-color pixels. After cells in grids are marked, the processing of pixels to generate a skin grid is completed.

Figure 5:
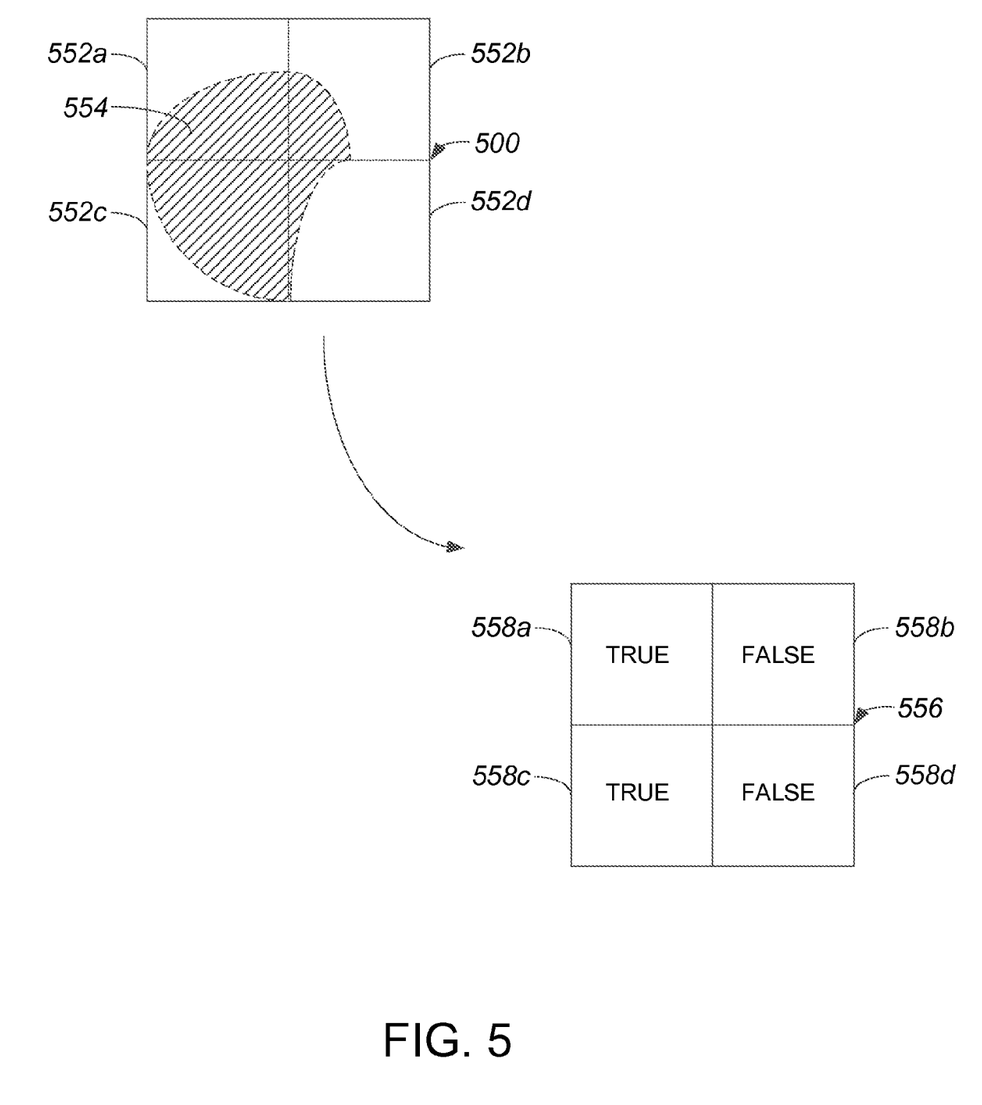
FIG. 5 is a diagrammatic representation of a process of mapping pixel blocks of an image to a two-dimensional Boolean grid in accordance with an embodiment.

An example of mapping pixel blocks to a skin grid will be described with respect to FIG. 5. FIG. 5 is a diagrammatic representation of a process of mapping pixel blocks of an image to a two-dimensional Boolean grid in accordance with an embodiment. Pixel blocks 552a-d of an image 500 are such that skin-colored pixels 554 are included in each pixel block 552a-d. As previously mentioned, pixel blocks 552a-d may contain any number of pixels, although it should be appreciated that pixel blocks 552a-d generally each contain approximately the same number of pixels. In other words, pixel blocks 552a-d are typically uniformly sized.

A determination of whether a pixel block 552a-d contains skin depends upon a threshold associated with a particular system, i.e., a system which processes an image to determine whether the image is offensive. The threshold used to determine whether a pixel block 552a-d contains skin may vary widely. In the described embodiment, when more than approximately half of a pixel block 552a-d includes skin-colored pixels 554, or when the pixel block 552a-d predominantly contains skin-colored pixels 554, the pixel block 552a-d is identified as containing skin. Thus, as shown, pixel blocks 552a, 552c may be identified as containing skin while pixel blocks 552b, 552d may be identified as not containing skin.

A skin grid 556, which may be a two-dimensional Boolean grid, includes cells or entries 558a-d such that there is essentially a one-to-one correspondence between pixel blocks 552a-d in image 500 and cells 558a-d of skin grid 556. Pixel block 552a maps to cell 558a, pixel block 552b maps to cell 558b, pixel block 552c maps to cell 558c, and pixel block 552d maps to cell 558d. Because pixel block 552a and pixel block 552c are each identified as containing skin, pixel block 558a and pixel block 558c are marked as "true." As pixel block 552b and pixel block 552d are each identified as not containing skin, pixel block 558b and pixel block 558d are marked as "false." Thus, skin grid 556 is effectively a representation of image 550 in terms of locations of skin-colored pixels.

A populated skin grid associated with an image may be classified to determine whether the image is offensive, e.g., pornographic. FIGS. 6A and 6B are a process flow diagram which illustrates a method of classifying at least one skin grid, e.g., step 213 of FIG. 2, in accordance with an embodiment. A process 213 of classifying at least one skin grid begins at step 605 in which cell "X" of a skin grid is obtained 605. In general, obtaining cell "X" of a skin grid may include reading or otherwise studying the contents of cell "X."

A determination is made in step 609 as to whether cell "X" is classified as skin. In one embodiment, determining whether cell "X" is classified as skin includes identifying whether cell "X" includes a "true" indication. If it is determined that cell "X" is classified as skin, then the classification of cell "X" is noted in step 613, and it is determined in step 617 whether there are additional cells in the skin grid. When the determination in step 617 is that there are additional cells in the skin grid, "X" is incremented in step 621, and process flow returns to step 605 in which the next cell in the skin grid is obtained.

Alternatively, if the determination in step 617 is that there are no additional cells in the skin grid, then the implication is that every cell of the skin grid has been obtained and essentially processed. Accordingly, locations of cells classified as skin are compared to models of poses in step 625. Models of poses may be representations of poses known to be offensive, e.g., pornographic. Such models may generally be stored in a database, and may be represented using two-dimensional Boolean grids such that areas of skin in the models are identified as such in the two-dimensional Boolean grids. In one embodiment, the skin grid is the same size as the grids associated with models of poses. A comparison of locations of cells classified as skin to models of poses may include utilizing machine learning techniques. Machine learning may be utilized to generate classifiers, and may involve techniques such as training a neural network and/or generating a statistical model. Machine learning may capture variations of grids that are indicative of pornography and not indicative of pornography.

After comparing locations of cells classified as skin to models of poses, it is determined in step 629 whether a pose is indicated by the skin grid, e.g., whether an offensive characteristic such as a pose is indicated. If the determination is that an offensive pose is not indicated, the skin grid is identified as being associated with an innocent image in step 633. That is, the skin grid is identified as not being offensive, e.g., not being pornographic, and the process of classifying at least one skin grid is completed. Alternatively, if it is determined in step 629 that the pose indicated by the skin grid is offensive, process flow proceeds to step 637 in which the grid is identified as being associated with an offensive, e.g., pornographic, image. Once the grid is identified as being associated with a non-innocent image, the process of classifying at least one skin grid is completed.

Returning to step 609, if it is determined that cell "X" is not classified as skin, the indication is that cell "X" corresponds to a pixel block of an image that is not predominantly made up of skin-color pixels. As such, process flow moves to step 617 in which it is determined whether there are additional cells in the grid to process.

The results of classifying one or more skin grids may generally be combined to provide a single, overall categorization for the one or more skin grids. By way of example, classifications based on skin grids generated for images associated with a particular web page may be amalgamated or otherwise statistically combined to determine an overall categorization for the particular web page. Similarly, classifications based on skin grids generated for images contained in an email message may be statistically combined to determine an overall categorization for the email message.

Figure 7:
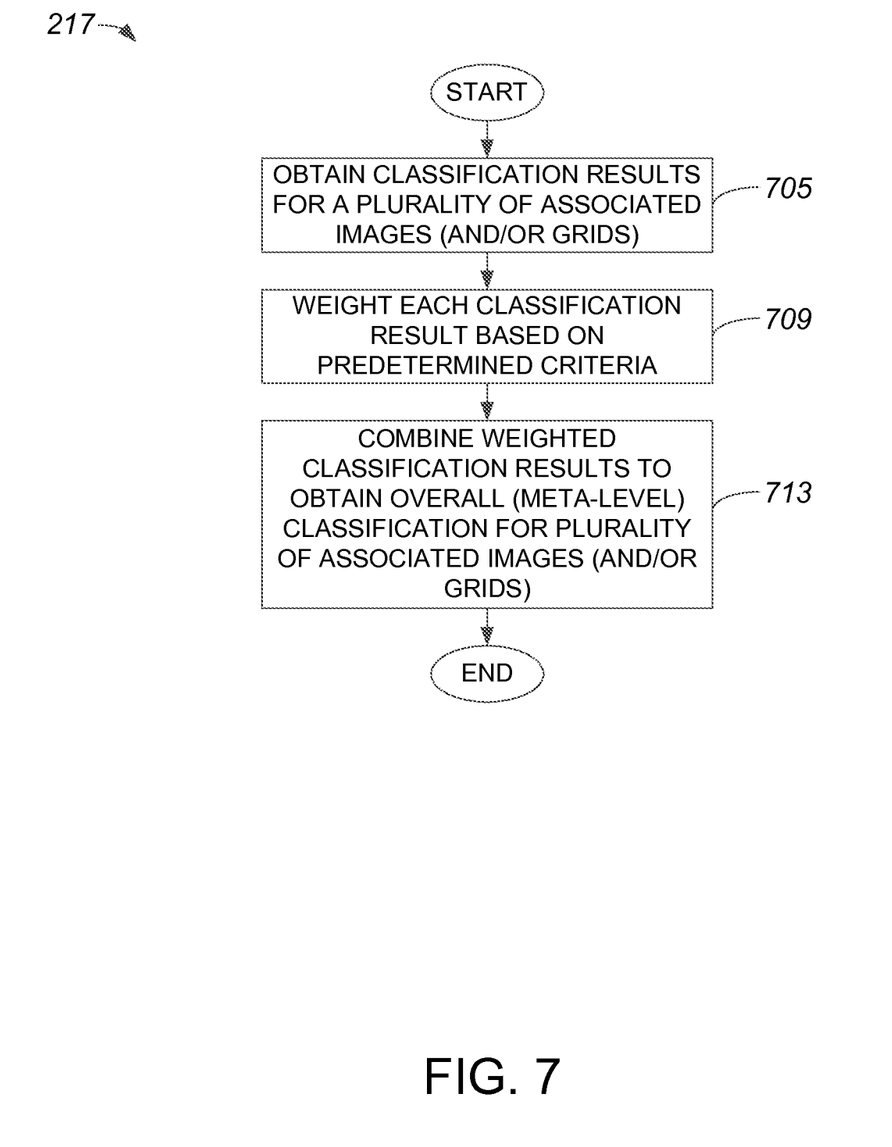
FIG. 7 is a process flow diagram which illustrates a method of statistically combining results of classifying skin grids to provide an overall characterization of images associated with the skin grids, e.g., step 217 of FIG. 2, in accordance with an embodiment.

With reference to FIG. 7, a process of statistically combining results of classifying more than one skin grid to provide an overall characterization of a set of images, e.g., step 217 of FIG. 2, will be described in accordance with an embodiment. A process 217 of providing an overall characterization of a set of images begins at step 705 in which classification results for a plurality of associated images and/or grids are obtained. In general, associated images may generally include images that have a relationship with each other. For example, the associated images may be, but are not limited to being, images contained in a single email, images associated with a particular domain, and/or images displayed on a particular web page.

Once classification results for associated images are obtained, each classification result may be weighted based on predetermined criteria in step 709. The predetermined criteria used to weigh classification results may vary widely. By way of example, the predetermined criteria may include classification confidence and image quality. Images of a higher quality, for instance, may be weighted more than images of a lower quality.

After each classification result is weighted based on predetermined criteria, the weighted classification results are combined in step 713 to obtain an overall classification for the associated images. The overall classification may be a meta-level classification. In one embodiment, a meta-level classification for associated images that are related through an e-mail, a domain, or a web page may be more precise than a classification for an individual image. Upon combining weighted classification results to obtain an overall classification, the process of providing an overall classification for a set of images is completed.

Figure 8:
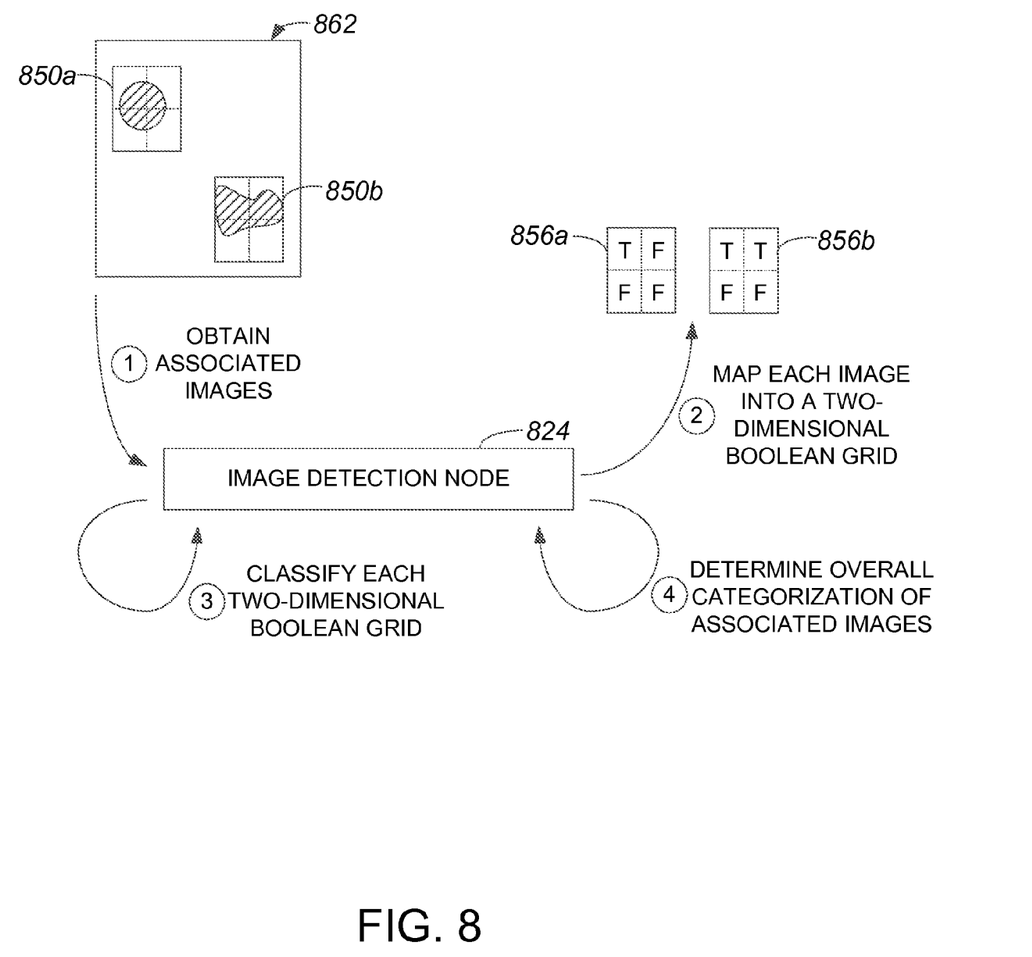
FIG. 8 is a diagrammatic representation of a process of determining an overall characterization of a set of associated images in accordance with an embodiment.

FIG. 8 is a diagrammatic representation of a process of determining an overall classification for a set of associated images in accordance with an embodiment. Images 850a, 850b have an association 862. That is, images 850a, 850b are associated with each other. In one embodiment, association 862 may be a web page, an Internet domain, or an email that includes images 850a, 850b.

An image detection node 824 obtains associated images 850a, 850b and maps each image 850a, 850b into a grid 856a, 856b. As shown, image 850a is mapped into grid 856a, and image 850b is mapped into grid 856b. Grids 856a, 856b may be two-dimensional Boolean grids in which a "T" or "true" value indicates that a corresponding pixel block in images 850a, 850b is identified as containing skin color pixels, while an "F" or "false" value indicates that a corresponding pixel block in images 850a, 850b is identified as not containing skin color pixels.

After mapping image 850a to grid 856a and image 850b to grid 856b, image detection node 824 classifies each grid 856a, 856b. Each grid 856a, 856b may be classified individually. Using the individual classification for each grid 856a, 856b, an overall categorization for association 862 may be determined. As discussed above with respect to FIG. 7, an overall categorization may be determined by applying weights to the individual classifications for each grid 856a, 856b. That is, an overall characterization for associated images 850a, 850b may be determined using individual classifications for grids 856a, 856b.

Although only a few embodiments of the present invention have been described, it should be understood that the present invention may be embodied in many other specific forms without departing from the spirit or the scope of the present invention. By way of example, while pixels blocks of an image have been described as being mapped to a skin grid or a two-dimensional Boolean grid, it should be appreciated that pixel blocks of an image may generally be mapped to any suitable data structure or arrangement. That is, pixels blocks of an image may be mapped to any suitable data structure or arrangement that is configured to contain information which identifies pixel blocks that contain pixels of a skin color.

A determination of whether pixels of a skin color are present in a particular pixel block may generally include determining whether pixels of any skin color are present. Alternatively, in some embodiments, a determination of whether pixels of a skin color are present in a particular pixel block may include determining whether pixels of a particular skin color are present.

Images depicting known offensive poses, e.g., known pornographic poses, may generally be mapped to skin grids. In other words, two-dimensional Boolean grids may be created for each image that contains a pose that is known to be offensive. As a result, when an image is to be categorized, a determination of when a skin grid associated with the image that is to categorized indicates that the image is offensive may include comparing the skin grid associated with the image that is to be categorized to skin grids of images which are known to be offensive.

An image that includes skin color pixels may include a significant amount of pixels that are not of a skin color. For example, an image may be such that an offensive human pose occupies a relatively small percentage of the image, while the rest of the image includes innocuous elements. In one embodiment, an analysis of whether the image is offensive may include first cropping the image such that substantially only the area of the image which includes skin color pixels is analyzed to determine whether the image is offensive. That is, substantially only an area of an image that includes pixels of a skin color may be analyzed to determine whether the image is offensive. By concentrating analysis on a region of interest, e.g., a region in which there are pixels of a skin color, of an image, the accuracy with which the image may be categorized may be further improved. For an embodiment in which substantially only the area of an image which includes skin color pixels is analyzed to determine whether the image is offensive, it should be appreciated that the area may be scaled such that a skin grid generated for the area is of substantially the same size as skin grids associated with images of known offensive poses.

When images are part of a video, it should be appreciated that a number of images which are classified as offensive before the overall video may be categorized as offensive may vary widely. Generally, a predetermined threshold number of offensive images may be set such that when a number of offensive images of a video exceeds the threshold number, the video is to be categorized as offensive. For instance, a threshold may be such that the classification of a single image from a video as offensive results in the video being categorized as offensive. Such a threshold may vary widely depending upon the requirements of a particular image detection module.

Additionally, within a video, consecutive frames are not necessarily analyzed to determine if the video is to be categorized as offensive. In other words, frames in a video may be essentially sampled in order to categorize the video. Further, the number of frames sampled in a video in order to categorize the video may vary widely. By way of example, if a predetermined number of frames of a video are sampled and none of the sampled frames is classified as offensive, the video may be classified as not offensive.

The embodiments may generally be implemented as hardware and, or software logic embodied in a tangible, i.e., non-transitory, medium that, when executed, is operable to perform the various methods and processes described above. That is, logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals such as those embodied in carrier waves. That is, a computer-readable medium may be associated with non-transitory tangible media and transitory propagating signals.

The steps associated with the methods of described above may vary widely. Steps may be added, removed, altered, combined, and reordered without departing from the spirit of the scope of the present invention. By way of example, prior to detecting skin color pixels in an image, the image may first be converted to a thumbnail sized image. In other words, each image that is to be categorized may be converted from its original form to a thumbnail sized image of a specified height and width prior to identifying any skin color pixels. Reducing images to thumbnail size may increase the efficiency with which the images may be categorized. Therefore, the present examples are to be considered as illustrative and not restrictive, and the examples are not to be limited to the details given herein, but may be modified within the scope of the appended claims.

The many features of the embodiments of the present invention are apparent from the written description. Further, since numerous modifications and changes will readily occur to those skilled in the art, the present invention should not be limited to the exact construction and operation as illustrated and described. Hence, all suitable modifications and equivalents may be resorted to as falling within the spirit or the scope of the present invention.

What is claimed is:

1. A method for categorizing at least one image, the method comprising:
    obtaining, by an image procurement interface of a computing apparatus, the at least one image, the at least one image containing a plurality of pixel blocks, each of the pixel blocks containing a plurality of pixels from the at least one image;
    for each of the pixel blocks, mapping, by a grid generation module of the computing apparatus, the pixel block to a cell of a first two-dimensional grid, wherein each of the cells identifies whether a corresponding pixel block from the at least one image contains more than a threshold number of skin-colored pixels;
    classifying, by a grid classification module of the computing apparatus, the first grid, wherein classifying the first grid includes determining whether the first grid is indicative of an offensive characteristic by comparing locations of the cells of the first two-dimensional grid which identify pixel blocks that contain more than the threshold number of skin-colored pixels to a reference two-dimensional Boolean grid known to represent the offensive characteristic;
    if the first grid is determined to be indicative of the offensive characteristic, categorizing, by a categorization module of the computing apparatus, the at least one image as offensive; and
    if the first grid is determined to be not indicative of the offensive characteristic, categorizing, by the categorization module of the computing apparatus, the at least one image as not offensive.

2. The method of claim 1, wherein the offensive characteristic is an offensive pose.

3. The method of claim 2, wherein the offensive pose is a pornographic pose.

4. The method of claim 1, wherein categorizing the at least one image as offensive comprises categorizing the at least one image as a pornographic image.

5. The method of claim 1 further comprising:
    processing the at least one image by transforming the at least one image into a hue saturation brightness (HSB) color space, classifying hue components and saturation components associated with the at least one image, and ignoring brightness components associated with the at least one image.

6. The method of claim 1, further comprising:
determining whether a first one of the pixels blocks contains pixels that are predominantly in a first range of colors; and
if the first pixel block contains pixels that are predominantly in the first range of colors, marking a first one of the cells to indicate that the first pixel block contains pixels that are predominantly in the first range of colors.

7. The method of claim 6, wherein the first range of colors is a range of skin colors.

8. The method of claim 1, wherein the first grid is a two-dimensional Boolean grid.

9. The method of claim 1, wherein obtaining the at least one image includes obtaining a first image and a second image, the first image and the second image being part of one media presentation, and wherein mapping the at least one image to at least the first grid comprises mapping the first image to the first grid and mapping the second image to a second grid, the method further comprising:
classifying the second grid, wherein classifying the second grid includes determining whether the second grid is indicative of the offensive characteristic;
if the second grid is determined to be indicative of the offensive characteristic, categorizing the second image as offensive;
if the second grid is determined to be not indicative of the offensive characteristic, categorizing the second image as not offensive; and
if the first image and the second image are categorized to be offensive, categorizing the media presentation as offensive.

10. The method of claim 1, wherein the at least one image is a thumbnail image.

11. A non-transitory computer-readable medium comprising computer program code, the computer program code that, when executed by a processor, causes the processor to:
obtain the at least one image, the at least one image containing a plurality of pixel blocks, each of the pixel blocks containing a plurality of pixels from the at least one image;
for each of the pixel blocks, map the pixel block to a cell of a first two-dimensional grid, wherein each of the cells identifies whether a corresponding pixel block from the at least one image contains more than a threshold number of skin-colored pixels;
classify the first grid, wherein classifying the first grid includes determining whether the first grid is indicative of an offensive characteristic by comparing locations of the cells of the first two-dimensional grid which identify pixel blocks that contain more than the threshold number of skin-colored pixels to a reference two-dimensional Boolean grid known to represent the offensive characteristic;
if the first grid is determined to be indicative of the offensive characteristic, categorize the at least one image as offensive; and
if the first grid is determined to be not indicative of the offensive characteristic, categorize the at least one image as not offensive.

12. The non-transitory computer-readable medium of claim 11, wherein the offensive characteristic is a pornographic pose.

13. The non-transitory computer-readable medium of claim 12 wherein categorizing the at least one image as offensive comprises categorizing the at least one image as a pornographic image.

14. The non-transitory computer-readable medium of claim 11, further comprising computer program code that, when executed by the processor, causes the processor to:
process the at least one image by transforming the at least one image into a hue saturation brightness (HSB) color space, classifying hue components and saturation components associated with the at least one image, and ignoring brightness components associated with the at least one image.

15. The non-transitory computer-readable medium of claim 11, further comprising computer program code that, when executed by the processor, causes the processor to:
determine whether a first one of the pixels blocks contains pixels that are predominantly in a first range of colors; and
if the first pixel block contains pixels that are predominantly in the first range of colors, mark a first one of the cells to indicate that the first pixel block contains pixels that are predominantly in the first range of colors.

16. The non-transitory computer-readable medium of claim 15, wherein the first range of colors is a range of skin colors.

17. The non-transitory computer-readable medium of claim 11, wherein the first grid is a two-dimensional Boolean grid.

18. The non-transitory computer-readable medium of claim 11, wherein obtaining the at least one image comprises obtaining a first image and a second image, the first image and the second image being part of one media presentation, and wherein mapping the at least one image to at least the first grid comprises mapping the first image to the first grid and mapping the second image to a second grid, the computer-readable medium further comprises computer program code that, when executed by the processor, causes the processor to:
classify the second grid, wherein classifying the second grid includes determining whether the second grid is indicative of the offensive characteristic;
if the second grid is determined to be indicative of the offensive characteristic, categorize the second image as offensive;
if the second grid is determined to be not indicative of the offensive characteristic, categorize the second image as not offensive; and
if the first image and the second image are categorized to be offensive, categorizing the media presentation as offensive.

19. The non-transitory computer-readable medium of claim 11, wherein the at least one image is a thumbnail image.

20. An apparatus for categorizing at least one image, the apparatus comprising:
a memory;
a processor communicatively coupled to the memory; and
software instructions stored in the memory that, when executed by the processor, cause the processor to:
obtain the at least one image, the at least one image containing a plurality of pixel blocks, each of the pixel blocks containing a plurality of pixels from the at least one image;
for each of the pixel blocks, map the pixel block to a cell of a two-dimensional grid, wherein each of the cells identifies whether a corresponding pixel block from the at least one image contains more than a threshold number of skin-colored pixels;

classify the grid, wherein classifying the grid includes determining whether the grid is indicative of an offensive characteristic by comparing locations of the cells of the two-dimensional grid which identify pixel blocks that contain more than the threshold number of skin-colored pixels to a reference two-dimensional Boolean grid known to represent the offensive characteristic;

if the grid is determined to be indicative of the offensive characteristic, categorize the at least one image as offensive; and if the grid is determined to be not indicative of the offensive characteristic, categorize the at least one image as not offensive.

21. The apparatus of claim 20, wherein the memory further stores software instructions that, when executed by the processor, cause the processor to identify a set of pixel blocks included in the plurality of pixel blocks which contain pixels that are predominantly in a first range of colors.

22. The apparatus of claim 21, wherein the first range of colors is a range of skin colors.

\* \* \* \* \*